Figure 1:
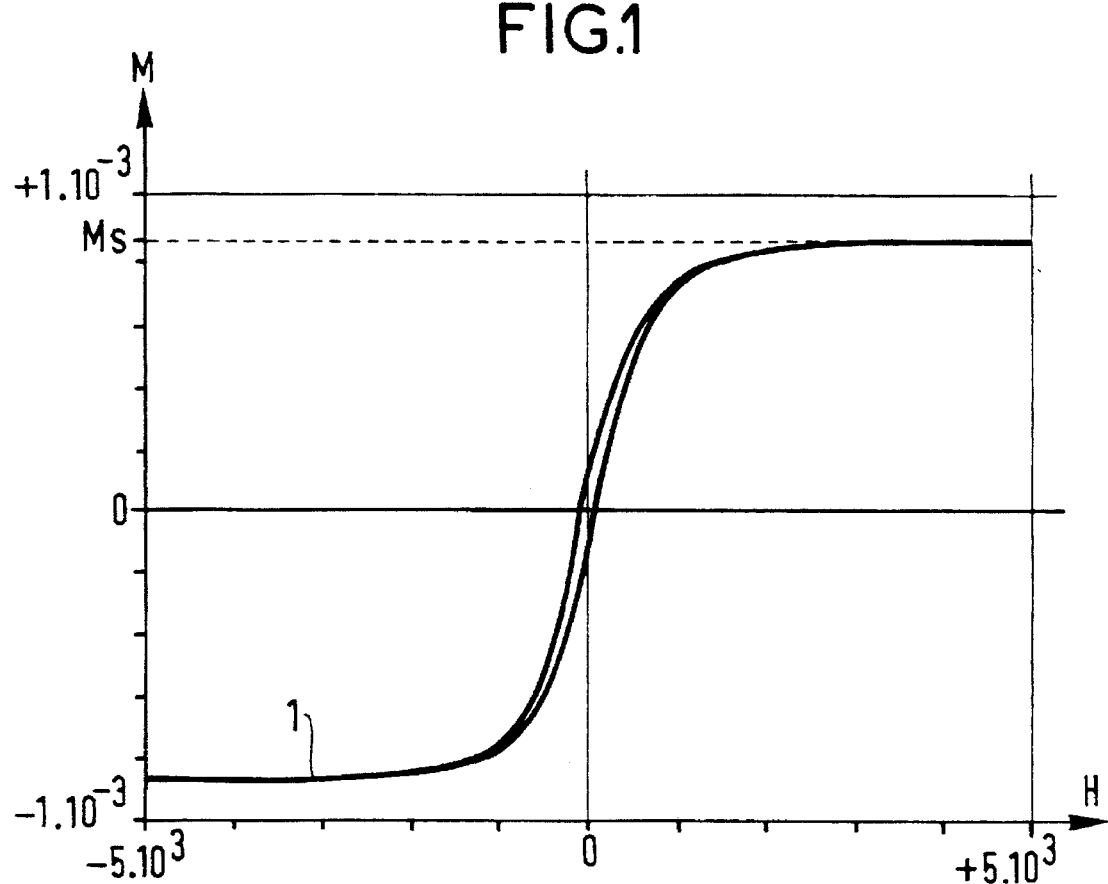

United States Patent [19]
Galaj et al.

[11] Patent Number: 5,635,582
[45] Date of Patent: *Jun. 3, 1997

[54] MAGNETIC COPOLYMER, A METHOD OF MANUFACTURE AND APPLICATIONS THEREOF

[75] Inventors: Stanislas Galaj, Arcueil; Alain Le Mehaute, Gif Sur Yvette, both of France

[73] Assignee: Alcatel Alsthom Compagnie Generale D'Electricite, Paris, France

[*] Notice: The term of this patent shall not extend beyond the expiration date of Pat. No. 5,637,675.

[21] Appl. No.: 313,440

[22] Filed: Sep. 27, 1994

[30] Foreign Application Priority Data

Sep. 28, 1993 [FR] France .................................. 93 11504

[51] Int. Cl.⁶ .................................................. C08G 12/06
[52] U.S. Cl. ........................ 528/229; 525/540; 528/391; 528/422; 528/480
[58] Field of Search ........................ 528/391, 422, 528/480, 229; 525/540

[56] References Cited

FOREIGN PATENT DOCUMENTS

| | | |
|---|---|---|
| 0455224A2 | 11/1991 | European Pat. Off. . |
| 0545819A1 | 6/1993 | European Pat. Off. . |
| WO9106887 | 5/1991 | WIPO . |

OTHER PUBLICATIONS

Arevalo et al, "Mechanism of Electropolymerization of 1–Naphtylamine in Aqueous Acid Media", *Electrochimica Acta*, vol. 35, No. 4, 1990, pp. 741–748.
French Search Report FR 9311504 Jun. 17, 1994.

*Primary Examiner*—Shelley A. Dodson
*Attorney, Agent, or Firm*—Sughrue, Mion, Zinn, Macpeak & Seas

[57] ABSTRACT

The present invention concerns a magnetic copolymer having a structural unit comprising a first multivalent radical and a second multivalent radical derived from an aminoaromatic compound selected from a substituted amine containing at least two condensed benzene nuclei, a substituted polycyclic compound containing at least one aniline unit in its structure, and an aniline derivative substituted on the ring by an ethynylidene or paraphenylene side chain, these compounds being in their reduced or oxidized forms, said first and said second radical being coupled together by a carbon-nitrogen bond and the nitrogen atoms being separated by a single aromatic ring, characterized in that said first radical is derived from a compound selected from 1-naphthylamine, which may be substituted, in its reduced or oxidized form.

28 Claims, 1 Drawing Sheet

MAGNETIC COPOLYMER, A METHOD OF MANUFACTURE AND APPLICATIONS THEREOF

The present invention concerns a magnetic copolymer including multivalent radicals derived from aminoaromatic compounds. It also concerns a method of manufacture and applications of this copolymer.

European patent application EP-A-0 545 819 describes magnetic copolymers comprising two groups of aminoaromatic compounds, the first based on substituted derivatives of aniline with formula:

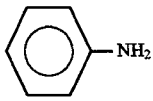

This copolymer, however, requires long and tedious preparation. The reaction yield is low and the product obtained contains the copolymer and a large amount of unreacted monomer. Different mixtures of solvents and repeated washing steps are required to extract the copolymer.

While aniline can currently be homopolymerized, homopolymerization of 1-naphthylamine has been attempted a number of times without success. In particular, Genies and Lapkowski (Electrochim. Acta 32, 1223, 1987) have studied the electropolymerization of 1-naphthylamine in a eutectic $NH_4F/HF$ medium and could only produce the dimer formed by carbon-carbon coupling with formula:

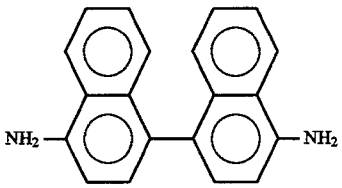

In addition, the synthesis conditions used by those authors were difficult and unlikely to be usable on an industrial scale.

Electrooxidation of 1-naphthylamine in aqueous acid medium (Electrochim. Acta 35(4), 741–748, 1990), produced a slightly electroactive conducting film which adhered to the electrode and was composed of a 1-naphthidine dimer formed by carbon-carbon coupling and a product formed by carbon-nitrogen coupling. It was not possible to determine whether this compound was a dimer or a polymer which would have had the following formula, with n greater than or equal to 1:

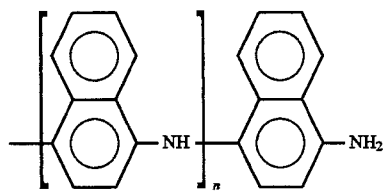

There was no mention of the film having magnetic properties.

The object of the present invention is to provide a magnetic copolymer which can readily be synthesized on an industrial scale.

The present invention thus provides a magnetic copolymer with a structural unit comprising a first multivalent radical and a second multivalent radical derived from an aminoaromatic compound selected from a substituted amine containing at least two condensed benzene nuclei, a substituted polycyclic compound containing at least one aniline unit in its structure, and aniline substituted on the nucleus by an ethynylidene or paraphenylene side chain, these compounds being in their reduced or oxidized forms, said first and said second radical being coupled together by a carbon-nitrogen bond and the nitrogen atoms being separated by a single aromatic ring, characterized in that said first radical is derived from a compound selected from 1-naphthylamine, which may be substituted, in its reduced or oxidized form.

These two radicals are preferably coupled together by carbon-nitrogen bonds in the para position of the aromatic ring, giving the polymer ferromagnetic properties. If the number of bonds in the ortho position does not exceed 15%, ferromagnetism is retained. The structural units are thus coupled to each other by carbon-nitrogen bonds, resulting in the alternating sequence —φ—N—φ—N—φ—N—φ—N— in the main chain, where φ represents an aromatic ring.

1-naphthylamine is also known as α-naphthylamine, naphthyl 1-amine, and 1-aminonaphthalene, depending on the author. The formula is:

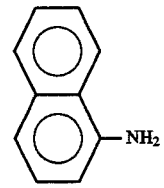

The same radical can exist in its oxidized or reduced form in accordance with the following equilibrium:

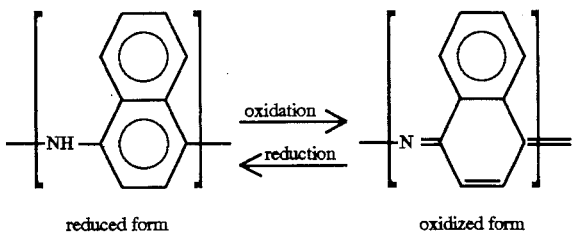

Examples of substituted amines containing at least two condensed benzene nuclei are: 1-amino-5-bromonaphthalene, 1-amino-2-chloronaphthalene, N-phenyl-1-naphthylamine, N-methyl-1-naphthylamine, 1-amino-2-methoxynaphthalene, 1-methylamino-2-methoxynaphthalene, 8-amino-2-methoxynaphthalene, or 8-methylamino-2-methoxynaphthalene.

A polycyclic compound is defined (cf. HANDBOOK of CHEMISTRY AND PHYSICS, 1978, page C-19, rule 32-12) as a compound containing a number of rings equal to the number of scissions required to transform the cyclic compound into a linear compound. Examples are: 1-amino-5,6,7,8-tetrahydronaphthalene, 1-amino-9-fluorenone, 1-(methylamino)anthraquinone, 1-aminofluorene and 1-aminoanthraquinone.

The present invention also relates to a magnetic copolymer comprising a structural unit containing a first radical A and a second radical B in the oxidized or reduced form having the following general formula:

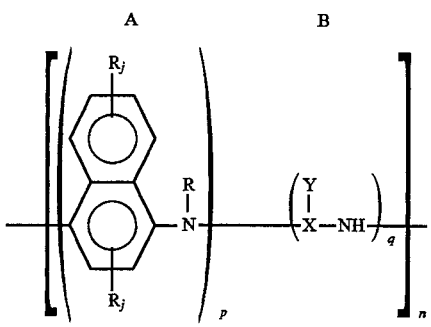

where, in said radical A:

$R_i$ (i=1 to 4) represents one to four substituents, each substituent being selected from hydrogen, chloride —Cl, bromide —Br, fluoride —F and iodide —I radicals, an alkoxyalkyl radical (a univalent radical derived from a linear acyclic hydrocarbon) of the type —$(CH_2)_w$—O—$(CH_2)_v$—$CH_3$ with w lying in the range 0 to 3 and v lying in the range 0 to 11 (preferably 0 or 1) and an aryl radical (a univalent radical derived from a monocyclic aromatic hydrocarbon) of the type —$\phi$, which may be substituted, $R_j$ (j=1 or 2) represents one or two substituents, each substituent being selected from hydrogen, chloride, bromide, fluoride and iodide radicals, an alkoxyalkyl radical and an aryl radical which may be substituted, and R is a substituent selected from hydrogen, an alkyl radical (a univalent radical derived from a saturated linear acyclic hydrocarbon) of the type —$(CH_2)_v$—$CH_3$ where v lies in the range from 0 to 11 (preferably 0 or 1) and an aryl radical which may be substituted, in said radical B:

Y is at least one proton-donating substituent which can form an internal salt with one of the nitrogen atoms from which it is separated by radical A, in which case the copolymer is essentially ferromagnetic, and when substituent Y forms a salt with one of the other nitrogen atoms, an essentially paramagnetic copolymer is obtained, and X is a multivalent radical derived from a compound containing at least one aromatic nucleus which can form part of the main chain of said copolymer, selected from a compound containing at least two condensed benzene nuclei, a polycyclic compound containing at least one aromatic nucleus, and a compound containing an aromatic nucleus with an ethynylidene or phenylene side chain, and in said general formula:

p and q are random whole numbers between 1 and 3, and n is a whole number larger than 2 and as large as possible.

Ferromagnetic copolymers produced in accordance with the present invention have a relative density of less than 1.5 and thus have the advantage of being lighter than other ferromagnetic products in general use, such as metals or ferrites.

The term "radical derived from a compound containing at least one aromatic nucleus which can form part of the main chain" means a radical which can form two bonds between a carbon of an aromatic nucleus and a nitrogen atom.

When X is derived from a compound containing at least two condensed benzene nuclei, substituent Y is preferably on the nucleus which is not in the main chain. Multivalent radical B may have formula:

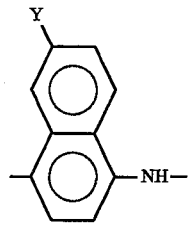

When X is derived from a polycyclic compound containing at least one aromatic nucleus, substituent Y is preferably on the nucleus which is not in the main chain. Multivalent radical B may have formula:

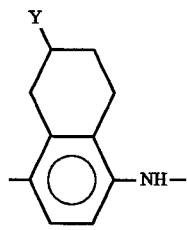

When X is derived from a compound containing an aromatic nucleus with an ethynylidene or phenylene side chain, substituent Y is on the side chain. Multivalent radical B may have formula:

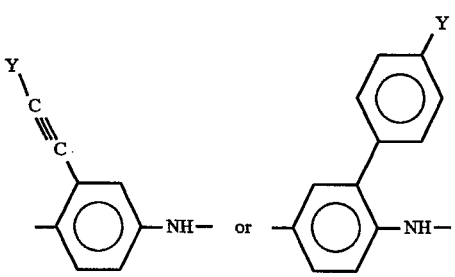

The structural units along the polymer chain may have a different number of radicals A and B. In addition, due to certain operational uncertainties, exceptionally p or q may locally equal zero. Nevertheless, strict alternation of radicals A and B is the most desirable configuration.

In a preferred embodiment of the present invention, the following three conditions are simultaneously satisfied:

p=1 and q=1, the X—Y bond is rigid, thus favoring certain internal bonds,

Y is at least one substituent selected from sulfo —$SO_3H$, phosphono —$PO_3H$ and carboxy —$CO_2H$ substituents.

X is preferably a multivalent radical derived from a naphthalene nucleus.

Radical B is advantageously a multivalent radical derived from an acid selected from: Cleve's acids: 8-amino-2-naphthalenesulfonic acid (the θ form) and 5-amino-2-naphthalenesulfonic acid (the β form), Laurent's acid: 1-amino-5-naphthalenesulfonic acid, peri acid: 1-amino-8-naphthalenesulfonic acid, and diacids: 1-naphthylamino-5,7-disulfonic acid and 1-naphthylamino-6,8-disulfonic acid. In this instance, X is a naphthalene nucleus and Y is a sulfo substituent —$SO_3H$.

Depending on the monomers used, the copolymers of the invention can be doped, but they can also be doped to turn them into conductors. Conducting copolymers of the present invention can be used to screen cables which gain in flexibility and lightness.

One fourth of the radicals A and/or B are advantageously in the oxidized form. Preferably, half of the B radicals are in the oxidized form and the other half are in the reduced form to favor internal salt formation which stabilizes the structure and promotes ferromagnetism.

A method for the manufacture of the copolymer of the invention comprises a first copolymerization step, in solution or suspension, of a first monomer which is a 1-naphthylamine which may be substituted and a second monomer which is a substituted aminoaromatic compound, and a second step for purification and separation of the reaction medium from said copolymer.

The second step includes washing the copolymer produced using a slightly basic solution such as, for example, a dilute N-methylformamide or ammonia solution in water, followed by washing with a mixture of water and methanol. This step eliminates soluble impurities, in particular monomer residues, from the product obtained.

In a preferred method of manufacture, copolymerization is carried out in an acidic medium selected from sulfuric acid, phosphoric acid, perchloric acid, paratoluenesulfonic acid, formic acid, acetic acid and trifluoroacetic acid.

The acid medium can contain a solvent (for a solution) or a dispersing agent (for a suspension), preferably selected from water, alcohols such as methanol, ketones such as acetone, organic acids such as acetic or formic acid, and mixtures thereof.

Copolymerization is effected by slowly adding an oxidizing agent to the suspension or solution containing the monomer mixture. In a first embodiment, the oxidizing agent is selected from hydrogen peroxide $H_2O_2$ and iodic acid $HIO_3$. As appropriate, the oxidizing agent can be used pure or in solution.

In a second embodiment, said oxidizing agent is gaseous oxygen.

In a third embodiment, copolymerization is effected by oxidation in the presence of an active current carrying electrode. The electrochemical route allows the oxidation ratio in the copolymer to be adjusted.

In a still further embodiment, copolymerization is effected by oxidation in the presence of a catalyst to increase the reaction yield.

In a first variant of the method of manufacturing the copolymer, the process also includes a third step of concentrating the magnetic copolymer in the product obtained from the second step. A soluble phase is extracted from the copolymer by dissolving it in a volatile basic solvent, then rapidly vacuum evaporating the solution to obtain a solid residue which is heat treated at about 110° C. in a vacuum to regenerate the ferromagnetic properties of the copolymer. The solvent is preferably anhydrous liquid ammonia.

Heat treatment is intended to rupture the salt bonds created between the basic solvent and the Y substituent in the copolymer, and to form other salt bonds between the Y substituent and amine and/or imine sites in the copolymer on first radical A. These new salt bonds can be created on a single main chain or between a number of copolymer chains. These new bonds are responsible for the appearance of ferromagnetic characteristics in the copolymer by balancing the very strong steric constraints which profoundly modify the electron structure of the copolymer.

In a second embodiment, the process further comprises a third magnetic copolymer concentration step for the product obtained from the second step. A soluble phase is extracted from the copolymer by dissolving it in a basic volatile solvent, then precipitating out the soluble phase by acidifying the solution to promote decomposition of the ammonium salt of the copolymer which is formed. The copolymer obtained is mainly amorphous. It is in the form of a gel when wet and porous blocks when dry. The color is a violet blue in basic media, becoming dark green in acidic media.

The solvent is preferably a solution of a volatile base in an organic solvent such as, for example, an alcoholic ammonia solution.

In a further embodiment, the soluble phase is solidified (by drying or precipitation) in a magnetic and/or electric field.

The copolymer of the invention can be used in a number of different forms. In a first implementation, the copolymer is suspended or dissolved to form a ferro-fluid. When confined in a magnetic field, it can be used, for example, as a magnetic seal. It can also be used to produce adhesives.

In another implementation, the copolymer containing proton-donating substrate Y is transformed into a salt with a bulky base such as tetraalkylammonium hydroxide. This operation makes the polymer fusible so that it can form a thin layer.

In this case, the deposited layer can be extremely thin, of the order of a nanometer, and can thus be used in various microscope techniques: tunnelling microscopes, atomic force microscopes, near field microscopes and damped wave microscopes.

In a variant, the copolymer is deposited in a plurality of thin layers separated by a layer of magnetic material different from said copolymer and selected from a diamagnetic material, a ferromagnetic material, a ferrimagnetic material, and a paramagnetic material.

Copolymers of the invention have a number of applications due to their very strong magnetic properties. They can be deposited in a thin layer on supports such as polyethylene, polyvinyl chloride, polymethyl methacrylate, polycarbonates, or epoxy resins. To this end they can act as a medium for written information, in particular tickets or credit cards, and as photographic or radiographic media.

These copolymers have applications in ultrahigh-frequency apparatus, in particular waveguides, circulators, polarizers, absorbers, screens, and filters. They may also be used in optical systems, in particular in display screens, dichroic systems, X-ray diffraction or absorption systems, or fiber optic multiplexing systems. More generally, they are applicable to electro-magneto-optical and electro-magneto-resistive systems.

Their magnetic properties can be adjusted to enable them to be used in magnetism control apparatus. Adjustment can be carried out chemically using a catalyst, electrochemically, mechanically by using pressure, in particular a piezoelectric material, or by heat treatment.

The copolymers can also be used in electrical equipment such as motors, transformers or inductors, where they make it possible to use magnetic materials that are not metallic.

Figure 2:
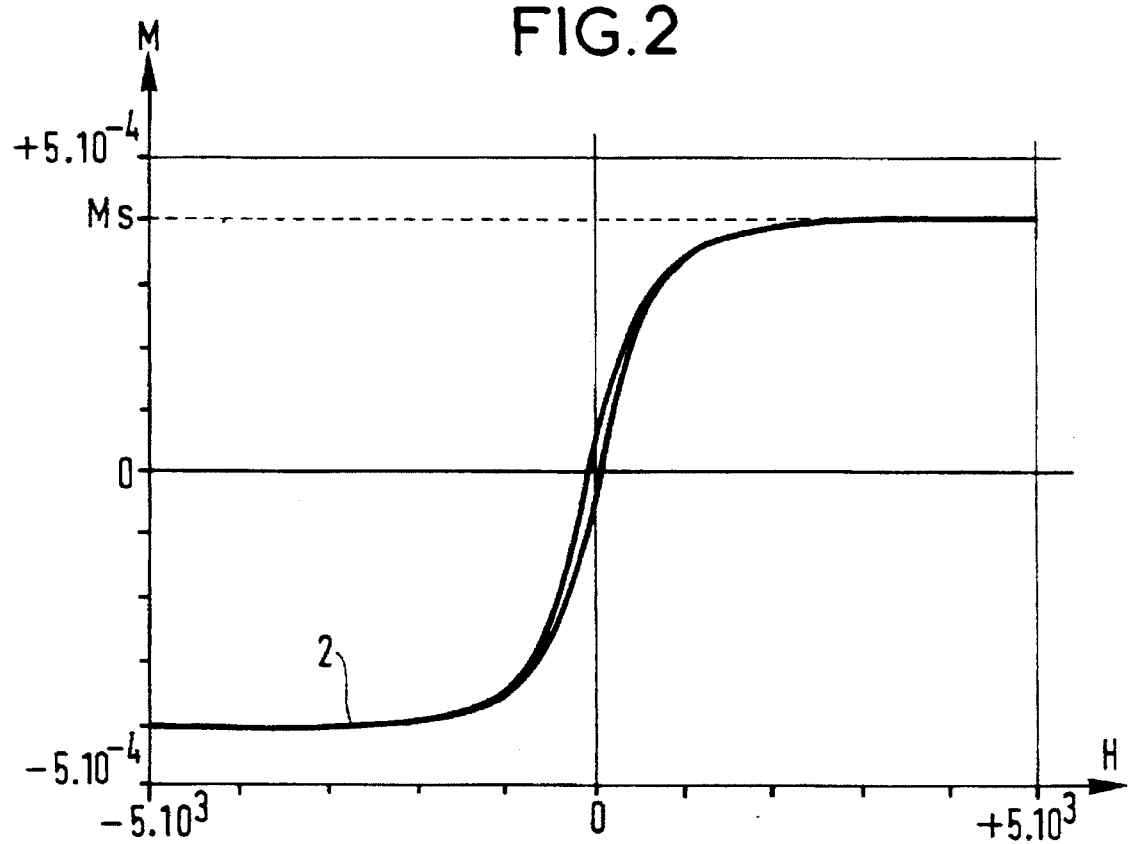

Further features and advantages of the present invention will become clear from the following non limiting examples of embodiments given by way of illustration, referring to the accompanying drawings in which:

FIG. 1 shows variation in magnetic signal M as a function of cyclic variation of field H for a ferromagnetic copolymer sample in accordance with the invention, FIG. 2 is analogous to FIG. 1 for another ferromagnetic copolymer sample in accordance with the invention.

In FIGS. 1 and 2, magnetic field H in Oersteds is shown as the abscissa, and magnetic signal M is shown as the ordinate in relative units (Electro-Magnetic Units: emu) for the mass of copolymer sample analyzed.

EXAMPLE 1

0.8 ml of an aqueous solution of 50% by weight of hydrogen peroxide $H_2O_2$ was added to a suspension of 0.64 g of 1-naphthylamine and 1 g of 5-amino-2-naphthalenesulfonic acid (the β form of Cleve's acid) in 10 ml of pure acetic acid. The suspension was stirred for 16 hours at room temperature and then centrifuged. The residue contained the desired copolymer as well as a high proportion of starting monomer.

The copolymer was separated by redispersing the residue several times in an aqueous solvent mixture followed by recovery and centrifuging. This was washed several times with a mixture of equal volumes of water and methanol, then washed at least twice in a solution of 50% of N-methylformamide in a water-methanol mixture to eliminate the 5-amino-2-naphthalenesulfonic acid. The wash steps were finished using solvents containing very little water: a 25% by volume solution of acetic acid in methanol, or diethyloxide.

33 mg of a black powder was obtained following low vacuum drying, giving a yield of 2%. The self-doped conducting copolymer obtained had the following general formula:

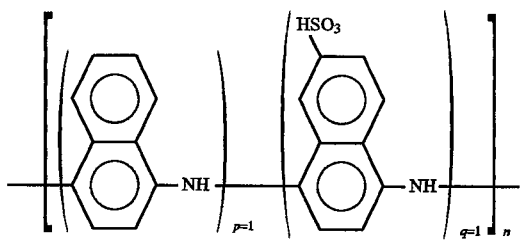

Magnetic measurements were carried out at a temperature of 300K in an alternating field gradient magnetometer. The result is shown as curve 1 in FIG. 1 which shows the evolution of magnetism M as a function of the magnetic field H applied to the sample. This curve is characteristic of a ferromagnetic compound and exhibits hysteresis. The saturated magnetization $M_s$ was 0.12 emu/g and the coercive field was of the order of 100 Oersteds.

EXAMPLE 2

A mixture of 4 ml of an aqueous solution of 50% by weight of hydrogen peroxide $H_2O_2$ and 10 ml of pure acetic acid was added dropwise over 2 hours to a stirred suspension of 3.2 g of 1-naphthylamine and 5 g of 5-amino-2-naphthalenesulfonic acid in 20 ml of anhydrous acetic acid. The reaction was carried out at room temperature and was stirred for about one hour following addition of the mixture.

The suspension was then washed and dried as described for Example 1. 193 mg of an almost black powder was obtained, giving a yield of 2.7%.

Magnetic measurements were carried out as described for Example 1. The result is shown as curve 2 in FIG. 2. This curve is characteristic of a ferromagnetic compound and exhibits hysteresis. The saturated magnetization $M_s$ was 0.07 emu/g and the coercive field was of the order of 100 Oersteds.

EXAMPLE 3

A mixture of 0.8 ml of an aqueous solution of 50% by weight of hydrogen peroxide $H_2O_2$ and 10 ml of 95% sulfuric acid was added dropwise over half an hour to a stirred solution of 0.64 g of 1-naphthylamine and 1 g of 5-amino-2-naphthalenesulfonic acid in 20 ml of 95% sulfuric acid. The reaction was carried out at room temperature and stirring was continued for about 20 minutes following addition of the mixture. The solution was then poured into 150 ml of water at 0° C. to precipitate the copolymer.

The suspension was then washed and dried as described for Example 1. 330 mg of an almost black powder was obtained, giving a yield of 20%.

Magnetic measurements were carried out as described for Example 1. The copolymer produced was ferromagnetic. The saturated magnetization $M_s$ was 0.07 emu/g and the coercive field was of the order of 100 Oersteds.

EXAMPLE 4

0.7 ml of 50% hydrogen peroxide $H_2O_2$ was added to a stirred suspension of 0.64 g of 1-naphthylamine and an excess (5 g) of 5-amino-2-naphthalenesulfonic acid in a solution of 5 ml of 70% perchloric acid in 10 ml of water. The reaction was carried out at room temperature and stirring was continued for about five hours following addition of the oxidizing agent.

The suspension was then washed and dried as described for Example 1. 65 mg of an almost black powder was obtained, giving a yield of 4% with respect to the stoichiometric quantities of the two monomers.

Magnetic measurements were carried out as described for Example 1. The copolymer produced was ferromagnetic. The saturated magnetization $M_s$ was 0.17 emu/g and the coercive field was of the order of 100 Oersteds.

The present invention is not limited to the embodiments described. Clearly, the skilled person could devise a number of different embodiments without departing from the spirit of the invention.

We claim:

1. A magnetic copolymer with a structural unit comprising a first multivalent radical and a second multivalent radical derived from an aminoaromatic compound selected from the group consisting of an amine containing at least two condensed benzene rings, a polycyclic compound containing at least one aniline unit in its structure, and an aniline derivative substituted on the nucleus by an ethynylidene or paraphenylene side chain, these compounds being in their reduced or oxidized forms, said first and said second radical being coupled together by a carbon-nitrogen bond and the nitrogen atoms being separated by a single aromatic ring, characterized in that said first radical is derived from a compound selected from 1-naphthylamine in its reduced or oxidized form, wherein the polycyclic compound is a compound containing a number of rings equal to the number of scissions required to transform the polycyclic compound into a linear compound.

2. A copolymer according to claim 1, wherein said structural unit contains a first radical A and a second radical B in the oxidized or reduced form having the following general formula:

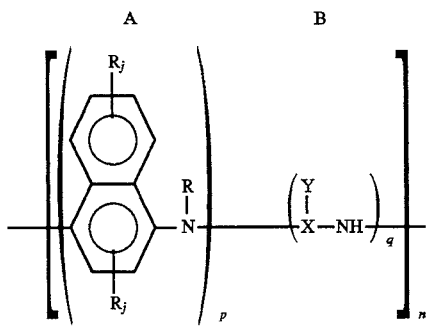

where, in said radical A:

R$_i$ (i=1 to 4) represents one to four substituents, each substituent being selected from the group consisting of hydrogen, chloride, bromide, fluoride and iodide radicals, an alkoxyalkyl radical and an aryl radical, R$_j$ (j=1 or 2) represents one or two substituents, each substituent being selected from the group consisting of hydrogen, chloride, bromide, fluoride and iodide radicals, an alkoxyalkyl radical and an aryl radical, and R is a substituent selected from the group consisting of hydrogen, an alkyl radical and an aryl radical, wherein the alkoxyalkyl radical is of the formula —(CH$_2$)$_w$—O—(CH$_2$)$_v$—CH$_3$, wherein w is an integer of 0 to 3 and v is an integer of 0 to 11, wherein the aryl radical is monocyclic, and wherein the alkyl radical is of the formula —(CH$_2$)$_v$—CH$_3$, wherein v is an integer of 0 to 11, in said radical B:

Y is at least one proton-donating substituent which can form an internal salt with one of the nitrogen atoms from which it is separated by radical A, and X is a multivalent radical derived from a compound containing at least one aromatic nucleus which can form part of the main chain of said copolymer, selected from the group consisting of a compound containing at least two condensed benzene nuclei, a polycyclic compound containing at least one aromatic nucleus, and a compound containing an aromatic nucleus with an ethynylidene or phenylene side chain, and in said general formula:

p and q are random whole numbers between 1 and 3, and n is a whole number larger than 2 and as large as possible.

3. A copolymer according to claim 2, wherein the following three conditions are simultaneously satisfied:

p=1 and q=1, the X—Y bond is rigid,

Y is at least one substituent selected from the group consisting of sulfo, phosphono and carboxy substituents.

4. A copolymer according to claim 2, wherein X is a multivalent radical derived from a compound containing a naphthalene nucleus.

5. A copolymer according to claim 2, wherein said radical B is a multivalent radical derived from an acid selected from the group consisting of:

8-amino-2-naphthalenesulfonic acid, 5-amino-2-naphthalenesulfonic acid, 1-amino-5-naphthalenesulfonic acid, 1-amino-8-naphthalenesulfonic acid, 1-naphthylamino-5,7-disulfonic acid, and 1-naphthylamino-6,8-disulfonic acid.

6. A copolymer according to any one of claim 2, wherein one fourth of said radicals A and/or B are in the reduced form.

7. A copolymer according to claim 6, wherein half of said radicals B are in the oxidized form and the other half are in the reduced form.

8. A method of manufacture of a copolymer according to claim 1, comprising a first copolymerization step, in solution or suspension, of a first monomer which is a 1-naphthylamine and a second monomer which is a substituted aminoaromatic compound, and a second step for purification and separation of the reaction medium from said copolymer.

9. A method of manufacture according to claim 8, wherein said copolymerization is carried out in an acidic medium selected from the group consisting of sulfuric acid, phosphoric acid, perchloric acid, paratoluenesulfonic acid, formic acid, acetic acid, and trifluoroacetic acid.

10. A method of manufacture according to claim 8, wherein said acid medium further contains a solvent or dispersing agent selected from the group consisting of water, alcohols, ketones, organic acids, and mixtures thereof.

11. A method of manufacture according to claim 8, wherein said copolymerization is carried out by slow addition of an oxidizing agent to the suspension or solution containing said first and said second monomer.

12. A method of manufacture according to claim 11, wherein said oxidizing agent is selected from the group consisting of hydrogen peroxide and iodic acid.

13. A method of manufacture according to claim 11, wherein said oxidizing agent is gaseous oxygen.

14. A method of manufacture according to claim 8, wherein said copolymerization is carried out by oxidation in the presence of an active current carrying electrode.

15. A method of manufacture according to claim 8, wherein said copolymerization is carried out by oxidation in the presence of a catalyst.

16. A method of manufacture according to claim 8, further including a third step comprising extracting a soluble phase from the copolymer by dissolution in a volatile basic solvent, then rapidly vacuum evaporating the solution to obtain a solid residue, and heat treating said solid residue.

17. A method of manufacture according to claim 16, wherein said solvent is anhydrous liquid ammonia.

18. A method of manufacture according to claim 8, further including a third step comprising:

extracting a soluble phase from said copolymer by dissolution in a volatile basic solvent, then precipitating said soluble phase by acidifying said solution.

19. A method of manufacture according to claim 18, wherein said solvent is a solution of a volatile base in an organic solvent.

20. A method of manufacture according to claim 16, characterized in that said soluble phase is solidified in a magnetic and/or electrical field.

21. A method of using a copolymer according to claim 1, wherein said copolymer is suspended or dissolved to form a ferro-fluid.

22. A method of using a copolymer according to claim 1, wherein said copolymer is deposited in a layer of nanometric thickness.

23. A method according to claim 22, wherein said copolymer is deposited in several layers of nanometric thickness separated by a layer of magnetic material different from said copolymer and selected from the group consisting of a diamagnetic material, a ferromagnetic material, a ferrimagnetic material, and a paramagnetic material.

24. A method of using a copolymer according to claim 22, comprising forming the copolymer into a film substrate for photography, radiography or microscopy.

25. A method of using a copolymer according to claim 1, comprising forming the copolymer into a component for magnetic, optical, electro-magneto-optical, or electro-magneto-resistive systems.

26. A copolymer according to claim 1, wherein the amine containing at least two condensed benzene rings is selected from the group consisting of 1-amino-5-bromonaphthalene, 1-amino-2-chloronaphthalene, N-phenyl-1-naphthylamine, N-methyl-1-naphthylamine, 1-amino-2-methoxynaphthalene, 1-methylamino-2-methoxynaphthalene, 8-amino-2-methoxynaphthalene, and 8-methylamino-2-methoxynaphthalene.

27. A copolymer according to claim 1, wherein the polycyclic compound is selected from the group consisting of 1-amino-5,6,7,8-tetrahydronaphthalene, 1-amino-9-fluorenone, 1(methylamino)anthraquinone, 1-aminofluorene, and 1-aminoanthraquinone.

28. A method according to claim 8, wherein the substituted aminoaromatic compound is 5-amino-2-naphthalenesulfonic acid.

* * * * *